United States Patent [19]

Rushford

[11] Patent Number: 4,815,828

[45] Date of Patent: Mar. 28, 1989

[54] TECHNIQUES FOR OPTICALLY COMPRESSING LIGHT INTENSITY RANGES

[75] Inventor: Michael C. Rushford, Livermore, Calif.

[73] Assignee: The United States of America as represented by the United States Department of Energy, Washington, D.C.

[21] Appl. No.: 863,912

[22] Filed: May 16, 1986

[51] Int. Cl.$^4$ .................. G02F 1/13; G02B 27/00; G01J 1/00

[52] U.S. Cl. .................. 350/351; 350/349; 350/163; 250/339

[58] Field of Search ............... 350/352, 351, 348, 163, 350/164, 166, 349; 250/339, 505.1, 503.1, 504 R

[56] References Cited

U.S. PATENT DOCUMENTS

| | | |
|---|---|---|
| 3,114,836 | 12/1963 | Fergason . |
| 3,669,525 | 6/1972 | Adams et al. .................. 350/332 |
| 3,679,290 | 7/1972 | Adams et al. .................. 350/352 |
| 4,606,613 | 8/1986 | Urabe .................. 350/349 |

FOREIGN PATENT DOCUMENTS 1123117 8/1968 United Kingdom .

OTHER PUBLICATIONS

Jacobs, "Liquid Crystals as Large Aperture Waveplates and Circular Polarizers", SPIE, vol. 307, Polarizers & Applications, 1981.

Adams, "Cholesteric Films as Optical Filters", Journal of Applied Physics, vol. 4, No. 10, Sep. 1971.

Bleha et al., "Application of the LCLV to Real-Time Optical Data Processing", Optical Engineering, vol. 17, No. 4, 1978.

Primary Examiner—Stanley D. Miller
Assistant Examiner—Trong Q. Phan
Attorney, Agent, or Firm—L. E. Carnanhan; Roger S. Gaither; Judson R. Hightower

[57] ABSTRACT

A pin hole camera assembly for use in viewing an object having a relatively large light intensity range, for example a crucible containing molten uranium in an atomic vapor laser isotope separator (AVLIS) system is disclosed herein. The assembly includes means for optically compressing the light intensity range appearing at its input sufficient to make it receivable and decipherable by a standard video camera. A number of different means for compressing the intensity range are disclosed. These include the use of photogray glass, the use of a pair of interference filters, and the utilization of a new liquid crystal notch filter in combination with an interference filter.

5 Claims, 5 Drawing Sheets

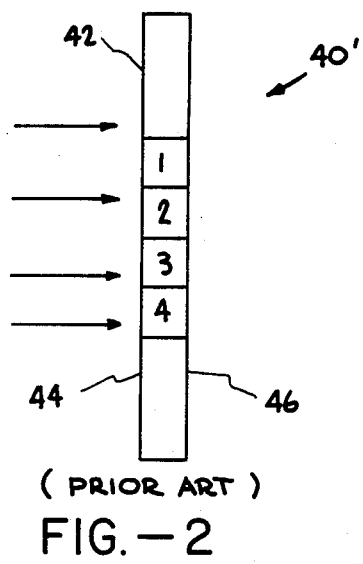
( PRIOR ART )
FIG.—2
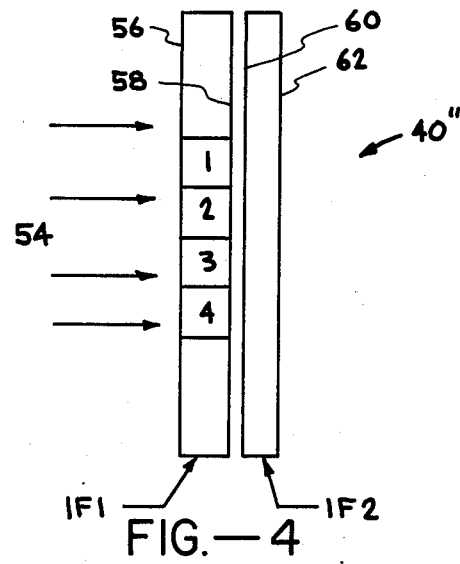
FIG.—4
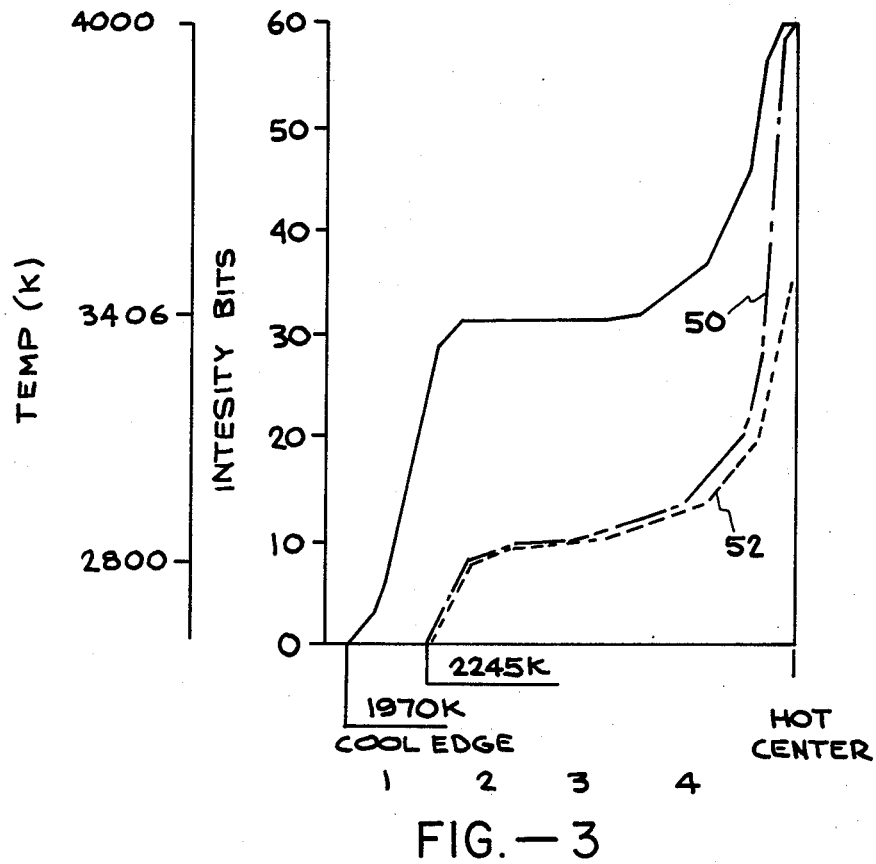
FIG.—3

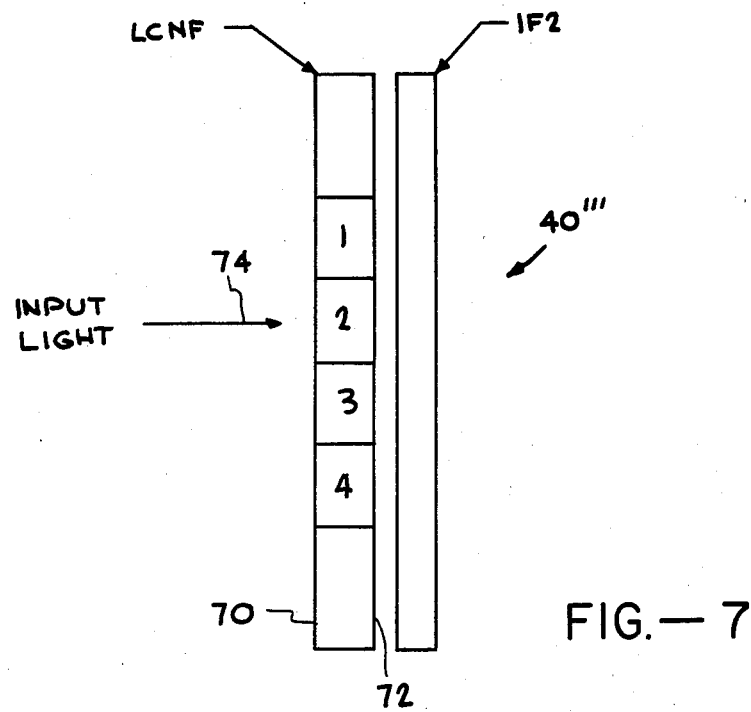
FIG.—7
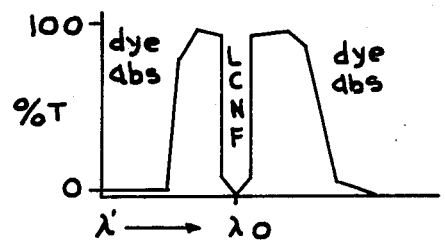
FIG.—8

TECHNIQUES FOR OPTICALLY COMPRESSING LIGHT INTENSITY RANGES

FIELD OF THE INVENTION

The United States Government has rights in this invention pursuant to contract number W-7405-ENG-48 between the United States Department of Energy and the University of California for the operation of the Lawrence Livermore National Laboratory.

BACKGROUND OF THE INVENTION

The present invention relates generally to techniques for compressing relatively large light intensity ranges and more particularly to different optical techniques for accomplishing this utilizing (1) photogray glass, (2) interference filters, and (3) a novel liquid crystal notch filter, the latter by itself being the subject of the present invention.

There are times when it is desirable to view an object having a relatively large light intensity range and record what is viewed by means of a camera or like instrument. For example, applicant has found a need to view the crucible containing molten uranium in an atomic vapor laser isotope separation (AVLIS). However, this molten uranium containing crucible functions as a black body having a center which is at a temperature of approximately 3800° k and outer edges at temperatures on the order of 1000° k. Thus, the temperature range across this black body is approximately 3000° k. and has a correspondingly large light intensity range (9 orders of magnitude) which is much too large for a standard video (2-3 orders of magnitude) camera or like instrument to receive and decipher. Therefore, if standard viewing and/or recording equipment is to be used to view the crucible, its light intensity range must be compressed (1-3 orders of magnitude) which is a tolerable level.

The concept of compressing a relatively large light intensity range is not new. Heretofore it has been done electronically, that is, by converting the incoming light to corresponding electrical signals, compressing the electrical signals, and then converting those compressed electrical signals back to light which itself is compressed relative to the incoming light. Applicant has found this "electronic" approach to light compression to be relatively complicated and expensive.

To applicant's knowledge there has been no suggestion of compressing a light intensity range entirely optically, that is, by acting on the light itself rather than converting the light to electrical signals which are then compressed and converted back to light.

SUMMARY OF THE INVENTION

In view of the foregoing, it is an object of the present invention to provide an entirely optical technique for compressing a light intensity range.

Another object of the present invention is to optically compress light intensity ranges in a number of different uncomplicated and economical ways.

A more particular object of the present invention is to provide a camera assembly including standard camera recording equipment for viewing and recording an object having a light intensity range which is normally outside the intensity range capabilities of the standard recording equipment used by the camera.

Another specific object of the present invention is to provide the last mentioned camera assembly with an entirely optical mean for compressing light intensity ranges which are otherwise too large for the camera assembly's recording equipment.

A further object of the present invention is to provide a novel liquid crystal notch filter which is especially suitable for use as a component in an entirely optical technique for compressing light intensity ranges.

As indicated immediately above, one aspect of the present invention is directed to a technique for compressing a light intensity range entirely optically. This is accomplished by utilizing a light filtering arrangement. In accordance with one embodiment of the present invention, the light filtering means includes a photogray lens. In accordance with another embodiment, the light filtering means includes a pair of serially spaced interference filters and in accordance with still another embodiment, the light filtering means includes a single interference filter in combination with a liquid crystal notch filter which itself is designed in accordance with the present invention.

The liquid crystal notch filter just mentioned i of a general type known in the art, that is, a filter configured to pass light at all wavelengths except for light at a relatively narrow wavelength band which defines the filter's notch. In accordance with the present invention, this otherwise readily available filter is modified in a way which causes the wavelength band to vary, at least to a limited extent, with temperature. This temperature sensitive liquid crystal notch filter and a known interference filter together form a light filtering arrangement which is especially suitable for compressing light intensity ranges of the type associated with molten uranium containing crucibles, that is, light intensity ranges associated with temperature ranges on the order of 2000° k–3000° k.

Additional objects, advantages and novel features of the invention will be set forth in the description which follows and in part will become apparent to those skilled in the art upon examination of the following or may be learned by practice of the invention. The objects and advantage of the invention may be realized and attained by means of the instrumentalities and combinations particularly pointed out in the appended claims.

BRIEF DESCRIPTION OF THE DRAWINGS

The various aspects of the present invention recited briefly above will be described in more detail hereinafter in conjunction with the drawings wherein:

FIG. 2 diagrammatically illustrates a photogray lens which serves as the optical light compression assembly forming part of the camera illustrated in FIG. 1;

FIG. 3 graphically illustrates how the photogray lens of FIG. 2 functions to compress the light intensity range appearing at its front face;

FIG. 4 diagrammatically illustrates the utilization of two interference filters which cooperate with one another to form a second type of optical light compression assembly forming part of the camera illustrated in FIG. 1;

FIG. 7 diagrammatically illustrates an interference filter in combination with a liquid crystal notch filter designed in accordance with the present invention such that the two together form a third type of optical assembly for compressing a light intensity range appearing at the front face of the liquid crystal notch filter;

FIG. 8 diagrammatically illustrates how the liquid crystal notch filter functions apart from the interference filter in accordance with the present invention.

DETAILED DESCRIPTION OF THE INVENTION

Reference will now be made in detail to preferred embodiments of the-invention, examples of which are illustrated in the accompanying drawings. While the invention will be described in detail in connection with these preferred embodiments, it will be understood that it is not intended to limit the invention to those embodiments. On the contrary, it is intended to cover all alternative modifications and equivalents as may be included within the spirit and scope of the invention as defined by the appended claims.

Figure 1:
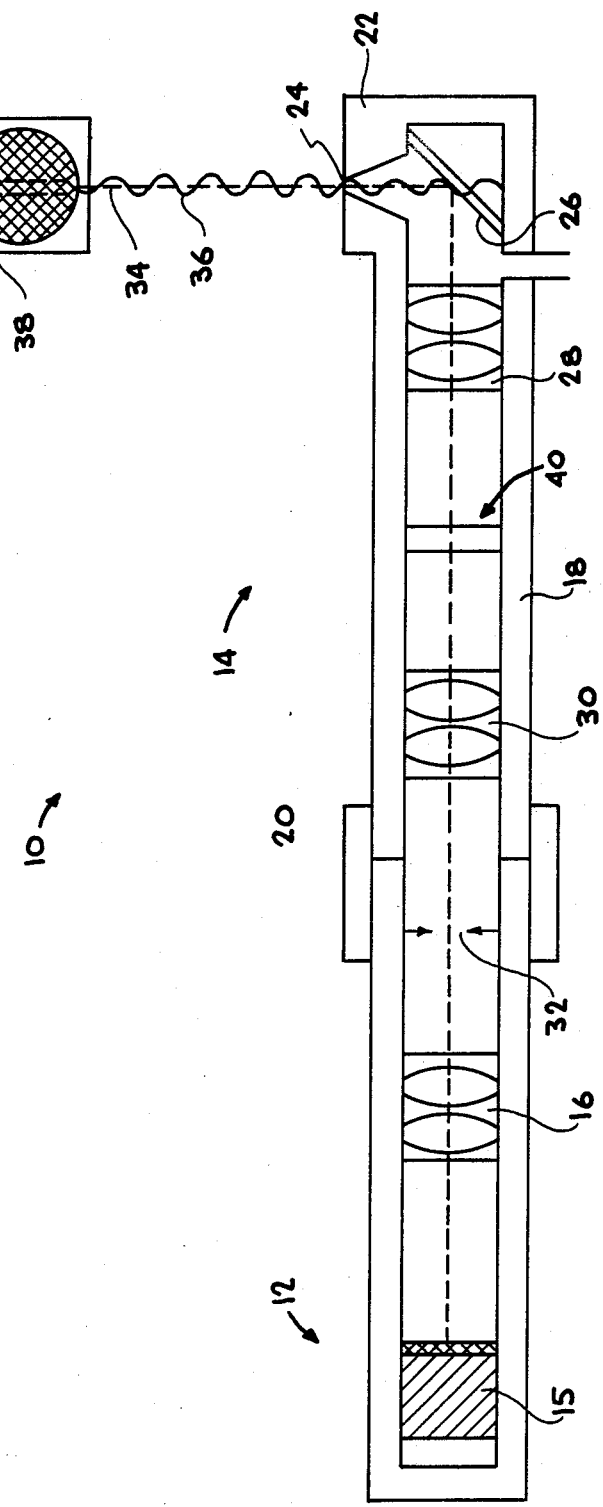
FIG. 1 is a diagrammatic illustration of a pin hole camera including an assembly designed in accordance with the present invention for optically compressing the light intensity range from an object being viewed by the camera.

Turning now specifically to the drawings, attention is first directed to FIG. 1 which illustrates a pin hole camera assembly which is generally indicated by the reference numeral 10 and which includes two sections, a camera section 12 and a separate and distinct optical section 14. The camera section, which is only partially shown, may be of any suitable known kind, in its entirety, or it may be identical to the corresponding camera section in applicant's pending U.S. patent application Ser. No. 863,911, filed simultaneously with the present application and entitled pin hole camera assembly having X-ray blocking capabilities. In either case, the camera section includes a camera 15 and a lens assembly or eye piece 16 which may have a fixed focus or one which is variable as in the copending patent application just recited. Optics section 14 includes a subsection 18 fixedly mounted in spaced-apart coaxial relationship with the input to camera section 12 by suitable means such as coupling 20 and a subsection 22 which extends perpendicular to subsection 18 and which defines a pin hole aperture 24. The optics section 14 may include any suitable optics to reproduce an image of its aperture 24 at the entrance. Pupil cf camera section 12. In the particular embodiment illustrated, this is accomplished in the same way as the corresponding optics section in the above recited copending patent application. Specifically, an inclined mirror or other suitable light reflecting surface 26 is fixedly disposed at the juncture between subsections 18 and 22 for directing light entering aperture 24 through subsection 18 in the direction of camera section 12. Spaced-apart eye pieces 28 and 30 located within subsection 18 relay this light to an image of the aperture generally indicated at 32 on the entrance pupil of camera section 12. Also eye piece 28 forms an image of the source 12 on an intensity compressor arrangement to be discussed hereinafter.

Inasmuch as overall camera assembly 10 illustrated in FIG. 1 is especially suitable for viewing an object which includes a source of x-radiation, specifically molten and evaporating uranium in a crucible forming part of an AVLIS system, the light reflecting surface 26 is preferably designed to absorb the x-radiation and follows a gas purged hole 32 where the purge gas repels uranium evaporant hence maintaining a highly reflective surface 26, as described in the above recited copending application. In FIG. 1, the visible light entering aperture 24 of optics section 14 is diagrammatically illustrated by dotted lines at 34 while x-radiation entering the aperture is diagrammatically illustrated by wavy line 36. Both are shown emanating from an object 38 being viewed by the camera assembly.

Camera assembly 10 is designed especially for viewing an object having a relatively large light intensity range, specifically a range which is typically outside the normal capabilities (2–3 orders of magnitude) of standard camera equipment to decipher and record. One such object is molten uranium in a crucible where the temperature rang across the crucible is as high as 3000° k, thereby resulting in a correspondingly large light intensity range of 6–9 orders of magnitude. To this end, camera assembly 10 includes an arrangement for compressing (by 1–3 orders of magnitude) the light intensity range being viewed before it reaches camera section 12. This arrangement which is generally indicated at IC 40 is shown forming part of overall optics section 14. As will be seen hereinafter, this arrangement can take the form of several different embodiments, although in each case, it functions to compress the light intensity range being viewed by the camera assembly entirely by means of optics utilizing a light filtering technique. This is in contrast to known electronic compression techniques such as the one described previously.

Turning now to FIG. 2, one specific embodiment of compression arrangement IC 40 is illustrated there at 40'. This latter arrangement which is known in the art includes a photogray lens 42 having a front face 44 and a back face 46. Photogray glass becomes dark within a specific wavelength range and a transparent filter after the photogray glass maximizes observing the range of transmission that the photogray glass can achieve. Infrared cut filters can be placed at the input of the photogray in order to reduce erasure of the UV light written image, which could reduce overall contrast achievable and image life time.

For purposes of discussion, a portion of photogray lens 42 will be divided into four segments numbers 1–4. FIG. 3 graphically illustrates a light intensity pattern which might appear at the front face 44 of the photogray lens. This pattern which is generally indicated at the reference numeral 50 represents visible light. As seen in FIG. 3, the maximum intensity of pattern 50 appears across section 2 of the photogray lens with lesser intensities appearing across sections 1, 3 and 4.

It is the nature of photogray glass to "darken" to a greater extent in those areas receiving more UV light than in those areas receiving lesser UV light. Therefore, in the example illustrated by pattern 50 in FIG. 3, section 2 of the photogray lens will darken to a greater extent than sections 1, 3 and 4, thereby filtering out more of the light trying to pass through section 2 than the other sections. The resultant light pattern appearing at the back face of the photogray lens has a compressed intensity range as shown at 52. Note that the intensity differences across section 2 of the lens between curve 50 and 52 are greater than the intensity differences between the two curves along the other sections. Thus, while the intensity range represented by light pattern 50 may be too large for standard camera recording and/or reviewing equipment, the intensity range corresponding to pattern 52 may be acceptable. In this latter regard, it should be noted that the compressed pattern 52 not only has a different (smaller) intensity range than uncompressed pattern 50 but its intensity distribution across the lens has been changed resulting in grey scale distortion of the scene being viewed and therefore the use of arrangement 40' (or any of the other arrangements to be described) would not be suitable where it is necessary to preserve the grey scale being viewed. However, for the purpose of viewing a crucible containing molten uranium in an AVLIS system in order to monitor molten areas, arrangement 40' (and any other arrangements to be described) can be used since a change in intensity distribution is not critical. Further, in the case where arrangement 40' is used to monitor a crucible containing molten uranium it is only necessary to monitor a particular wavelength of light, for example the wavelength $\lambda 0$.

While the use of a photogray lens is certainly substantially less complicated than the electronic approach described previously for compressing a light intensity range, it does have a disadvantage which may not make it entirely practical for viewing a crucible containing molten uranium. Specifically, photogray glass requires ultra-violet radiation to activate its filtering characteristics. There is not a large amount of ultra-violet light in the intensity distribution in a crucible containing molten uranium. Therefore, while such an arrangement may be a suitable technique in pin hole cameras designed to look at objects which have ultra-violet radiation, for example the sun, they are not an entirely satisfactory approach for use in viewing ultra-violet free objects or low ultra-violet objects such as uranium containing crucibles.

Turning now to FIG. 4, attention is directed to an arrangement for compressing a light intensity range designed in accordance with a second embodiment of the present invention and one which does not have the disadvantage associated with arrangement 40', as discussed immediately above. This second arrangement which is generally indicated at 40" in FIG. 4 includes a pair of spaced-apart interference filters $IF_1$ and $IF_2$ which are in optical series with one another. The interference filter $IF_1$ is positioned immediately in front of interference filter $IF_2$ with respect to the incoming light generally indicated at 54. For purposes of discussion, interference filter $IF_1$ is shown including a front face 56 and a back face 58 and the interference filter $IF_2$ is shown including a front face 60 and a back face 62 for purposes of description, IF, interference filters is separated into four sections (area wise), sections 1, 2, 3 and 4, as was arrangement 40'.

Figure 5A:
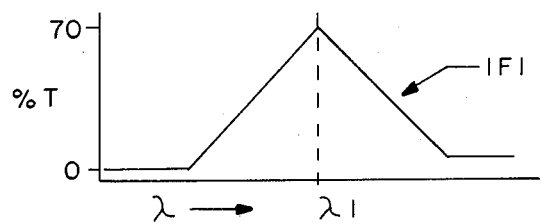
FIGS. 5A, 5B and 5C and FIGS. 6A, 6B and 6C illustrate how the interference filters of FIG. 4 function to compress a light intensity range appearing at the front face of one of the interference filters.
Figure 5B:
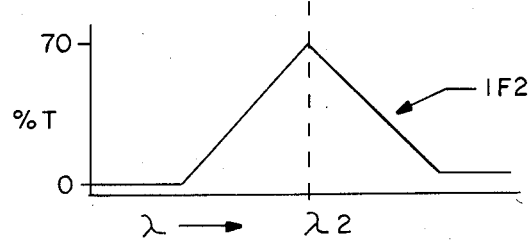
Figure 5C:
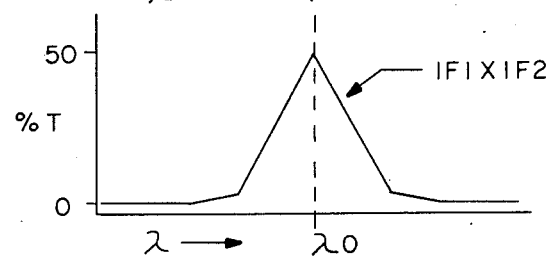

An interference filter is a known and readily available optical device which does not transmit any appreciable light, except within a very narrow pass band which shifts to a limited extent in response to changes in temperature. The interference filter may be designed to pass a specific wavelength band and shift in a particular way with temperature or, at least, the temperature responsive shift can be readily calibrated. FIG. 5A graphically illustrates the transmission characteristics of an interference filter $IF_1$ while FIG. 5B graphically illustrates the transmission characteristics for an interference filter $IF_2$ forming overall arrangement 40". At room temperature the interference filter $IF_1$ passes only light within a very narrow $\lambda 1$ band while interference filter $IF_2$ passes only light in a very narrow $\lambda 2$ band. Note, that the two bands $\lambda 1$ and $\lambda 2$ overlap when the two interference filters are positioned in serial relationship to one another optically, as illustrated in FIG. 4, such that the resultant pass band is even a narrower $\lambda 0$ band which is shown in FIG. 5C. Thus, at room temperature (for example 68° F.), each section 1, 2, 3 and 4 of arrangement 40" passes light in the narrow wavelength band of $\lambda 0$ only.

Figure 6A:
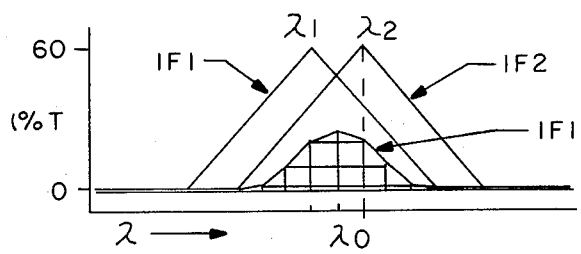
Figure 6B:
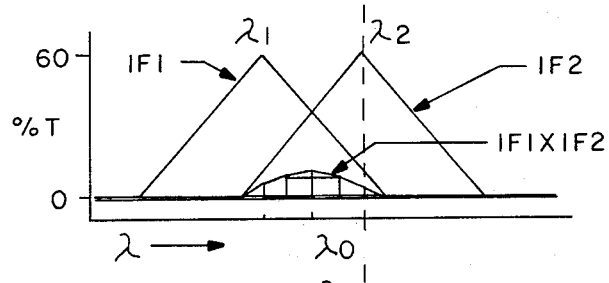
Figure 6C:
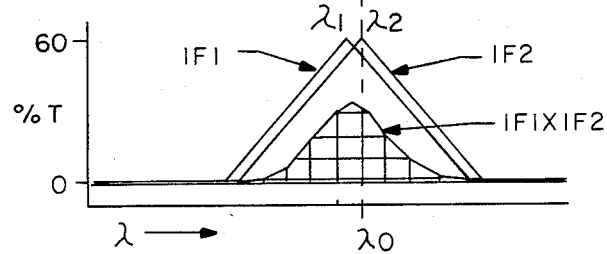

Referring specifically to FIG. 6, the two transmission bands $\lambda 1$ and $\lambda 2$ corresponding to interference filters $IF_1$ and $IF_2$, respectively, are shown in overlapped fashion so as to combine to define the ultimate pass band $\lambda 0$ which is shown shaded in FIG. 6. This shaded $\lambda 0$ band results when the interference filters are at room temperature. If the pass band of one of these filters is subjected to changes in temperature so as to cause its pass band to shift while the other remains at room temperature, the resultant $\lambda 0$ band will either decrease in size or increase in size. For example, let it be assumed that the interference filter $IF_1$ is subjected to such temperature changes while the interference filter $IF_2$ is not. If the temperature change is in one direction, the pass band $\lambda 1$ will shift in one direction, for example to the left as illustrated in FIG. 6B, and if the temperature change is in the opposite direction the pass band $\lambda 1$ will shift in the opposite direction, for example to the right as illustrated in FIG. 6C. When the pass band $\lambda 1$ shifts in one direction, $\lambda 0$ decreases in size causing less light to pass therethrough (and thereby compressing light intensity) and when $\lambda 1$ shifts in the opposite direction, $\lambda 0$ increases in size causing more light to pass therethrough.

In the case of arrangement 40", the entire arrangement can be positioned within or as part of optics section 14 of camera assembly 10 but, in any case, must be positioned so that the temperature across interference filter $IF_2$ remains constant, for example at room temperature, while the temperature across interference filter $IF_1$ corresponds to or at least is directly proportional to the temperature range across the object being viewed, for example a crucible containing molten uranium. Under these circumstances, the pass band $\lambda 1$ associated with each section 1, 2 and so on of interference filter $IF_1$ will vary depending upon the temperature at that section such that when combined with the corresponding section of interference filter $IF_2$, the amount of light passing through both filters will vary with the temperature at its front face in the manner discussed above. As a result, assuming that the light intensity range at the input to arrangement 40" corresponds to the temperature range at the object being viewed, arrangement 40" will compress the light intensity range.

It should be apparent from the foregoing that arrangement 40" is not dependent upon ultra-violet light as is arrangement 40'. However, arrangement 40" is dependent upon temperature and assumes that the object being viewed has a light intensity range which corresponds to its temperature range. It is also assumed that arrangement 40" can be appropriately located relative to the object being viewed such that interference filter $IF_1$ is subjected to a proportional temperature range while interference filter $IF_2$ is maintained at a fixed temperature. In the case of a pin hole camera, applicant has found it difficult to develop the temperature changes across the interference filter $IF_1$ in proportion to the actual temperature range associated with a crucible containing molten uranium and therefore arrangement 40" is not the most ideal arrangement for use in viewing such an object. Since light that can heat filter IFI only transmits to the spacer layer in the band λ0 (visible) some light in the infrared could reach the spacer layer. However the optics do not form sharp images for IR radiation.

A more ideal arrangement is illustrated in FIG. 7 and generally designated by the reference numeral 40'''. This arrangement, like arrangement 40'' includes an interference filter $IF_2$ as a second or downstream filter forming part of a pair of filters. However, the upstream filter is not another interference filter but rather a liquid crystal notch filter designed in accordance with the present invention. This latter filter, which will be described in more detail below and which is generally designated LCNF has a front face 70 and a back face 72. As illustrated in FIG. 7, the liquid crystal notch filter is positioned in front of and spaced from interference filter $IF_2$ so as to first receive input light from the object being viewed, as indicated by means of arrow 74. As will be described hereinafter, the notch filter is configured to vary with temperature and combines with the interference filter $IF_2$ which is intended to remain at a fixed temperature to compress the light intensity range appearing at the front face of the liquid crystal notch filter. In this regard, for purposes of description, the liquid crystal notch filter has been divided into aligned sections 1, 2 3 and 4.

Before discussing how the overall compression arrangement 40''' functions to compress the light intensity range of a light pattern appearing on the front face of the liquid crystal notch filter, attention is directed to this latter filter per se. Liquid crystal notch filters generally are known in the art. A detailed discussion of such a device appears in a publication entitled LIQUID CRYSTALS AS LARGE APERTURE WAVEPLATES AND CIRCUITRY POLARIZERS by Stephen D. Jacobs dated 1981, SPIE Vol. 307, and two additional publications. They are CHOLESTERIC FILMS AS OPTICAL FILTERS, James Adams, Werner Hass, and John Daily, Journal of Applied Physics Vol. 42, No. 10, September 1971, and LIQUID CRYSTAL LASER BLOCKING FILTERS, S. D. Jacobs and K. A. Cerqua, Laboratory for Laser Energetics, Rochester N.Y., LLE Review, Vol. 15. Apr.-June 1983, Lab report No. 157. The liquid crystal notch filter (LCNF) described there is one which passes all light, except for light in a very narrow band. For purposes herein, that band will be referred to as the filter's notch and may be designed to fall within a particular wavelength band. This type of device has been commercialized and advertised as a laser blocking filter, for example for use in laser goggles which are used to block the wavelength of laser light by individuals who work with such light. It is important that these commercial devices be manufactured to be thermally stable. For the protection of the user, the filter's notch cannot shift in wavelength for that would leave the user unprotected with respect to the laser light being handled. It is apparently relatively easy to make laser goggles thermally stable since most of the light passes through the filter, except for the light in the wavelength defining the notch. Thus, little if any infrared radiation will be absorbed and the filter will not heat up. So long as the LCNF does not heat up, its notch will not shift.

While the prior art liquid crystal notch filter just described is particularly suitable for use in laser goggles, its thermal stability is not a desirable quality for use as part of overall compression arrangement 40'''. Quite to the contrary, the liquid crystal notch filter forming part of arrangement 40''' must be thermally responsive in a controlled way, that is, in a way which causes its notch to shift either linearly or in a way that can be readily calibrated (e.g., predicted). In accordance with one aspect of the present invention, the liquid crystal notch filter is combined with suitable means that will make it absorb infrared radiation and heat up, thereby causing its notch to shift red in response to this heat in a controlled manner. This is best illustrated in FIG. 8 which shows a transmission curve as a function of wavelength for such a liquid crystal notch filter, when the latter is at room temperature. Note that at room temperature the filter transmits light at all visible wavelengths, except for a relatively narrow band of circularly polarized light centering at λ0. At the same time, the liquid crystal notch filter is designed to absorb radiation outside a 2 or 3 FWHM wide region about the notch. The location of the absorption band depends upon the anticipated infrared radiation band (e.g., temperature range) to which the liquid crystal notch filter is to be subjected to. For example, in the case of a metal containing crucible which displays temperature extremes between 2000° K. and 4000° K., the absorption band might be short of 0.6 UN to 10 UM, while the notch (λ1) might be 0.5 UM.

One way to make the liquid crystal notch filter responsive to temperature is by doping it with a compatible component, for example known organic dyes, so that the doped LCNF has an infrared absorption band outside the notch region. However, the organic dye or other such means must not-interfere with the transmission of light as does the notch itself. Its role is simply to absorb light and produce heat due to, for example, the organic molecules in the dye when dye is used as the doping agent. A proposed working embodiment of a thermally responsive liquid crystal notch filter includes R B or crystal violet perclorhte as the doping agent. That particular LCNF has a notch at the wavelength 633 mm and the absorption band is outside the notch wavelength at 633 mm. This thermally responsive liquid crystal notch filter is made in the following manner.

Mix a cholesteric liquid crystal with a dye that does not absorb much light at the central wavelength of the interference bandpass of choice. The mixture could be TM74A, B and TM75A, B from EM Industries Company, Hawthorn, N.Y., or similar cholesteric material (that will scatter one handedness circularly polarized light) with a doping of $10^{-2}$–$10^{-3}$ molar dye of Rhodamine B or similar absorption spectrum dye if considering a 480 nm badpass filter.

Place this CLC dye mixture between two thin pellicle (of for instance 2–8 micron thick nitrocellulose or mylar each) held apparent 6–36 micron by mylar spacers. This device will scatter light at the notch wavelength and absorb light at + −2 notch bandwidth about the notch wavelength.

The ambient temperature and CLC mixture are used to set the notch wavelength.

The input image locally heats the CLC dye device over a wavelength range where the dye absorbs light. The dye is necessary since liquid crystal and pellicle have little absorption in the visible spectrum.

In order to form an intensity compressor the notch wavelength must be at a longer wavelength than the NBIF since the notch will usually move to shorter wavelength as the CLC dye mixture heats up.

The CLC must be aligned in a Grandjean structure. This can be done with alignment layers on the pellicle. They are produced by vacuum evaporating at large angles of incidence with $SiO_2$, but these structures may contain aligned surface molecules that will serve this function, or after the CLC dye mixture is placed into the pellicle sandwich the pellicles can be sheared with respect to one another to force the CLC to align in the Grandjean structure.

The notch filter function shown in FIG. 8 is unlike those previously advertised, since light is absorbed in a linear polarizer. This is in contrast to two CLC in series that do not absorb light to form a notch.

Using two CLC in series forms the notch without absorbing any light. Two different notch filter are possible using serial CLC; one uses two CLC of the same handedness CLC with a half wave plate between them as in FIG. 3 of the Adams et al publication recited previously; the second using opposite pitch CLC as in FIG. 1. Each has the disadvantage for the present purposes that two layers need be heated to get a notch wavelength shift. With two different pitch CLC used serially it would be difficult for each CLC to have the same temperature dependent shifts to their scattering properties allowing a notch: filter to change its wavelength with temperature change. With the same CLC pitch and intervening half waveplate the device mass makes it difficult to heat both CLC layers following the intensity contours of the image.

Therefore one can consider not tuning the notch wavelength (for all input polarizations) but instead creating or destroying it based on the wavelength alignment between the scattering wavelength of each serial CLC. This would simply require the heating of one of the CLC and not the other by doping the first CLC with dye and not the second CLC. This will then allow the first CLC to heat in response to the input image on its surface as was done above. In this case the two CLC are offset with respect to one another at room temperature. The second CLC is at the NBIF wavelength and the first mixture, containing a dye doping, is adjusted to be at a longer wavelength than the NBIF. Now at room temperature the serial use of the two CLC and NBIF transmit one handedness polarized light at the NBIF wavelength. As the first dye doped CLC layer is heated by an input image its scattering wavelength begins to coincide with the second CLC. At perfect alignment no light transmits through the second CLC at the NBI wavelength.

FIG. 8 layout of a thermally activated intensity compressor. Light is incident from the left at al possible polarizations. A CLC doped with dye is held between pellicle of low mass to facilitate heating form an input image. The CLC scatters one handedness polarized light over a 20–40 nm bandwidth and transmits the other handedness polarization. Outside this bandwidth the CLC is transparent except for dye held in its mixture heats the CLC due to visible light absorption in the dye. Following this device the circular light is made linear and absorbed by a linear polarizer. The pellicles holding the CLC the quarter waveplate and linear polarizer form a notch filter. The tuning of the notch filter is viewed by a narrow band interference filter NBIF or $IF^2$. As the notch filter tunes past the NBIF the serial combination will not pass light when aligned in wavelength. Since an image drives the CLC heating the device will be less transparent for the brighter part of the image compared to a dimmer portion of the image.

The device functions to compress an interscene intensity distribution and intensity range to the same interscene distribution but of compressed intensity range. i.e., the grey scale is modified.

Figure 9A:
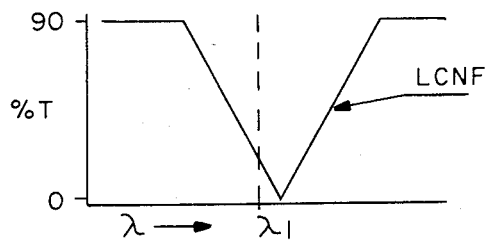
FIGS. 9A, 9B, 9C, 10A, 10B and 10C diagrammatically illustrate how the liquid crystal notch filter and interference filter function together to compress a light intensity range appearing at the front face of the liquid crystal notch filter.
Figure 9B:
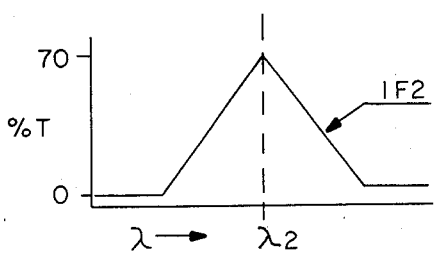
Figure 9C:
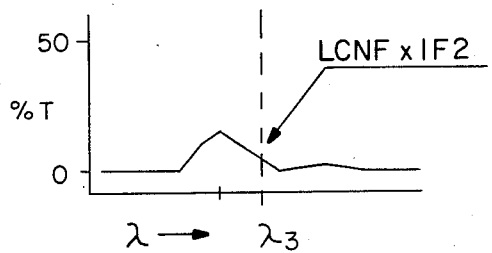
Figure 10A:
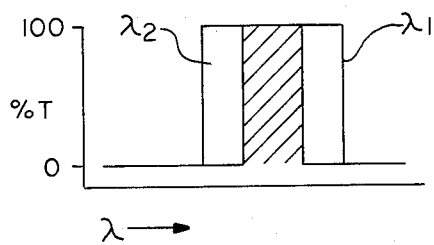
Figure 10B:
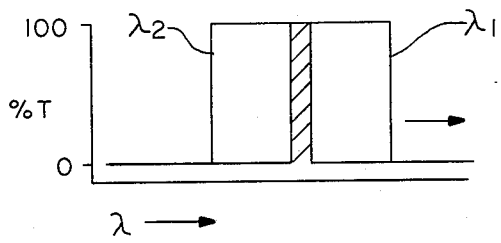
Figure 10C:
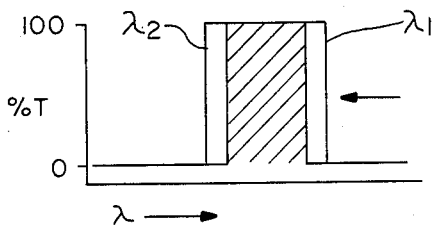

As indicated above, the thermally responsive liquid crystal notch filter just described has been designed in accordance with the present invention apart from its role in overall arrangement $40'''$. For example, such a filter could be used as a temperature sensing device. However, in overall arrangement $40'''$ it combines with interference filter $IF_2$ in order to compress the intensity range of light impinging on its front face. The way this is accomplished is best illustrated in FIGS. 9A, 9B and 9C and 10A, 10B and 10C in conjunction with FIG. 8. FIG. 9A is a graphic illustration of the light transmissive characteristics of the LCNF as a function of wavelength at ambient temperature while FIG. 9B is a similar graphic illustration of the interference filter $IF_2$. Note that the notch at $\lambda 1$ associated with the liquid crystal notch filter and the transmission band $\lambda 2$ of the interference filter, at room temperature overlap so as to provide a resultant pass band at $\lambda 3$. FIG. 10A better illustrates this by showing a notch $\lambda 1$ and the pass band $\lambda 2$ in overlapping relationship so as to produce a resultant ambient pass band $\lambda 3$. This pass band appears at each of the sections 1 through 4 across the two filters assuming that the temperature at each section of each filter is at the ambient temperature. If the temperature pattern across the liquid crystal notch filter varies in a way corresponding to, for example, the temperature across a molten uranium containing crucible, the $\lambda 1$ notch will shift a corresponding amount. Thus, the notch may shift to the right, for example in one section, as diagrammatically illustrated in FIG. 10B, and it may shift to the left in another section, as diagrammatically illustrated in FIG. 10C. In both of these cases, it is important to note that the pass band $\lambda 2$ associated with each section of the interference filter $IF_2$ remains constant. This is because the temperature across the interference filter remains constant, i.e., at the ambient temperature. With this in mind, it can be seen that a right hand shift of notch $\lambda 1$ causes the resultant pass band $\lambda 3$ to decrease in size and thereby transmit less light while a shift to the left increases $\lambda 3$ and thereby increases the amount of light passing through that section. A shift to the right corresponds to a hotter section and a shift to the left corresponds to a cooler one, relatively speaking. Thus, the overall pattern of light passing through the two filters has its light intensity range compressed in a way which corresponds to the temperature pattern across the front face of the liquid crystal notch filter. This technique is more ideal for use in a pin hole type camera assembly of the type illustrated in FIG. 1 than is the arrangement $40''$ because thermal radiation readily transmitted to the liquid crystal allowing the dye to heat the liquid crystal over a large wavelength range.

The foregoing description of the preferred embodiment of the invention has been presented for purposed of illustration and description. It is not intended to be exhaustive or to limit the invention to the precise form disclosed, and obviously many modifications and variations are possible in light of the above teaching. The embodiment was shown and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. An optical filter device comprising a temperature sensitive liquid crystal notch filter which transmits substantially all light, but absorbs light at a wavelength band which defines the filter's light absorption notch, chracterized by the fact that said filter's light absorption notch shifts predictably in response to changes in temperature, said temperature sensitive liquid crystal notch filter having a narrow wavelength light absorption notch and additionally having a predetermined infrared absorption band different from said light absorption notch, whereby the temperature of said liquid crystal notch filter is caused to increase in the presence of light in said infrared absorption band and said light absorption notch is caused to shift predictably in response thereto.

2. In a liquid crystal notch filter of the type which passes light at all wavelengths except at a relatively small, fixed wavelength band which defines the filter's notch, the improvement comprising means for modifying said liquid crystal notch filter in a way which causes said wavelength band to shift with changes in temperature and wherein said means for modifiying said liquid crystal notch filter includes means for providing a predetermined infrared absorption band different from said wavelength band defining said filter's notch whereby said liquid crystal notch filter additionally absorbs infrared radiation in said predetermined infrared absorption band and heated thereby.

3. The improvement according to claim 2 wherein said means for providing a predetermined infrared absorption band different from said wavelength band defining said filter's notch includes a compatible doping substance incorporated into said liquid crystal notch filter.

4. An optical filter device according to claim 1 wherein said temperature sensitive liquid crystal notch filter is doped with an organic dye to provide said predetermined infrared absorption band.

5. The improvement according to claim 3 wherein said compatible doping substance comprises an organic dye.

* * * * *